(12) United States Patent
De Campo et al.

(10) Patent No.: US 7,915,204 B2
(45) Date of Patent: Mar. 29, 2011

(54) SCALE SQUEEZE TREATMENT SYSTEMS AND METHODS

(75) Inventors: Floryan De Campo, Shanghai (CN); Allwyn Colaco, Princeton, NJ (US); Bruno Langlois, Paris (FR); Chris Jones, Cheslyn Hay (GB); Gary Woodward, Northwich Cheshire (GB)

(73) Assignee: Rhodia Operations, Aubervilliers (FR)

( * ) Notice: Subject to any disclaimer, the term of this patent is extended or adjusted under 35 U.S.C. 154(b) by 183 days.

(21) Appl. No.: 11/998,551

(22) Filed: Nov. 30, 2007

(65) Prior Publication Data

US 2009/0163389 A1 Jun. 25, 2009

(51) Int. Cl.
*C09K 8/528* (2006.01)

(52) U.S. Cl. .......... 507/237; 507/90; 507/236; 507/238; 507/240; 507/241; 507/245; 507/260; 507/267; 507/269; 166/304; 166/305.1

(58) Field of Classification Search .................... None
See application file for complete search history.

(56) References Cited

U.S. PATENT DOCUMENTS

| 6,342,467 | B1 | 1/2002 | Chang et al. | 507/110 |
| 6,831,108 | B2 | 12/2004 | Dahanayake et al. | 516/69 |
| 6,903,054 | B2 | 6/2005 | Fu et al. | 507/244 |
| 7,021,378 | B2 | 4/2006 | Prukop | 166/279 |
| 7,380,602 | B2 * | 6/2008 | Brady et al. | 166/282 |
| 2004/0254079 | A1 * | 12/2004 | Frenier et al. | 507/260 |

OTHER PUBLICATIONS

SPE 94593 paper, "Application of a Fully Viscosified Scale Squeeze for Improved Placement in Horizontal Wells", J.S. James, D.M. Frigo, SPE, and M.M. Townsend, Shell U.K. Ltd.; G.M. Graham, SPE, and F. Wahid, Scaled Solutions Ltd.; and S.M. Health, SPE, Clariant UK, Copyright 2005, Society of Petroleum Engineers Inc.
S. Gravsholt, "Viscoelasticity in Highly Dilute Aqueous Solutions of Pure Cationic Detergents", Journal of Colloid and Interface Science, 573(3), 575 (1976).
Hoffmann et al., "Influence of Ionic Surfactants on the Viscoelastic Properties of Zwitterionic Surfactant Solutions", Langmuir, 8, 2140-2146 (1992).
Hoffmann et al., The Rheological Behaviour of Different Viscoelastic Surfactant Solutions, Tenside Surf. Et., 31, 389-400, 1994.
"Rheological Measurements", Encyclopedia of Chemical Technology, vol. 21, pp. 347-372, (John Wiley & Sons, Inc., N.Y., N.Y., 1997, 4th ed.).

* cited by examiner

*Primary Examiner* — John J Figueroa

(57) ABSTRACT

An aqueous composition for treating hydrocarbon wells contains (a) a scale inhibitor and (b) a viscoelastic surfactant, and further contains from 0 to less than 1% by weight of acid selected from the group consisting of hydrochloric acid, sulfuric acid, phosphoric acid, formic acid, acetic acid, citric acid, maleic acid, hydrofluoric acid, and mixtures thereof.

8 Claims, No Drawings

SCALE SQUEEZE TREATMENT SYSTEMS AND METHODS

BACKGROUND OF THE INVENTION

This invention relates to the treatment of hydrocarbon-containing formations. More particularly, the invention relates to fluids which are used to optimize the production of hydrocarbon from a formation, known as well completion fluids, and to methods of treating such formations. The invention specifically relates to scale inhibition treatment compositions and methods.

Contact of various inorganic compounds present in hydrocarbon bearing rock formations with compounds present in oilfield process fluids, such as seawater, sometimes leads to the formation and precipitation of "scale", that is, water insoluble salts, such as barium sulfate and calcium carbonate, that can clog formation porosity and inhibit the flow of hydrocarbons from the formation to the wellbore. Scale inhibitors are used in oil fields to control or prevent scale deposition in the production conduit or completion system. Scale-inhibitor chemicals may be continuously injected through a downhole injection point in the completion, or periodic squeeze treatments may be undertaken to place the inhibitor in the reservoir matrix for subsequent commingling with produced fluids. Some scale-inhibitor systems integrate scale inhibitors and fracture treatments into one step, which guarantees that the entire well is treated with scale inhibitor. In this type of treatment, a high-efficiency scale inhibitor is pumped into the matrix surrounding the fracture face during leakoff. It adsorbs to the matrix during pumping until the fracture begins to produce water. As water passes through the inhibitor-adsorbed zone, it dissolves sufficient inhibitor to prevent scale deposition. The inhibitor is better placed than in a conventional scale-inhibitor squeeze, which reduces the retreatment cost and improves production.

Scale inhibitor squeeze fluids are typically Newtonian fluids which have difficulties to reach low permeability regions of hydrocarbon formations, especially horizontal hydrocarbon well formations. As a result, squeeze treatment with such fluids is not efficient in these regions and may cause the deposit of scale which can then block these regions, resulting in decreased production rates.

SPE paper 94593 describes using fully viscosified scale squeeze fluids to help optimize the squeeze treatment by allowing the fluid to reach the low permeability region and the horizontal zones. This SPE paper describes use of a xanthan polymer to place scale inhibitor in horizontal well N19z. However, the paper admits that the xanthan needed a breaker to recover all of it. Leaving such compounds in the well could then be damaging for the formation which will eventually decrease the production efficiency.

U.S. Pat. No. 6,903,054, Fu, et al., assigned to Schlumberger, Inc., which is hereby incorporated by reference in its entirety, describes a method for treating hydrocarbon-containing formations with a well treating fluid which includes a self-diverting acid that includes about 1-30% by weight of at least one acid selected from the group consisting of hydrochloric, sulfuric, phosphoric, formic, acetic, citric, maleic, and hydrofluoric acids, 1 to 20% by volume of a viscoelastic surfactant, and 0.7 to 20% by weight scale inhibitor.

It would be of great commercial value and importance to provide a hydrocarbon formation treatment scale inhibition composition and method of using that composition in a squeeze treatment which did not require a breaker to remove the composition and caused reduced formation damage, or did not damage the formation at all.

SUMMARY OF THE INVENTION

In a first aspect, the present invention is directed to an aqueous composition for treating hydrocarbon wells, comprising:
(a) a scale inhibitor, and
(b) a viscoelastic surfactant
said composition further comprising from 0 to less than 1% by weight of acid selected from the group consisting of hydrochloric acid, sulfuric acid, phosphoric acid, formic acid, acetic acid, citric acid, maleic acid, hydrofluoric acid, and mixtures thereof.

In another aspect, the invention comprises a scale squeeze kit for use in hydrocarbon wells consisting of two parts, (A) and (B), wherein part (A) consists of a viscoelastic surfactant and part (B) consists of a scale inhibitor, the two parts being compatible and adapted to be mixed, causing the scale inhibitor to be fully viscosified prior to placement in a well.

The viscoelastic surfactant can be, for example, a solution of an amphoteric surfactant selected from the group consisting of oleic amidopropyl betaine and erucic amidopropyl betaine The scale inhibitor can be any conventional scale inhibitor. Typical scale inhibitors are phosphate esters, phosphonates, phosphonate polymers, polycarboxylates, and phosphorous containing polycarboxylates. Examples of such scale inhibitors include phosphonate end-capped copolymers, sulphonate-functional phosphonated copolymers and soluble sources of diethylene triaminepentakis (methylenephosphonic acid).

The invention also comprises a hydrocarbon well scale squeeze treatment method which comprises mixing a scale inhibitor and a VISCOELASTIC SURFACTANT, thereby forming a gel, and placing the gel in the well during a squeeze treatment.

DETAILED DESCRIPTION

Using a fully viscosified scale inhibitor solution improves the placement of the scale inhibitor during squeeze treatments. Viscoelastic surfactants are compatible with typical scale inhibitors and have the advantage of minimizing the damage to the formation and maintaining high conductivity after the treatment (excellent fluid flowback).

Typically, water will be a major amount by weight of the treatment composition. Water is typically present in an amount by weight about 50% or more and more typically about 80% or more by weight of the treatment composition. The water can be from any source so long as the source contains no contaminants that are chemically or physically incompatible with the other components of the fluid (e.g., by causing undesirable precipitation). The water need not be potable and may be brackish and contain salts of such metals as sodium, potassium, calcium, zinc, magnesium, etc or other materials typical of sources of water found in or near oil fields.

The scale inhibitor component of the scale treatment of the present invention can be any known scale inhibitor, including, for example, phosphate ester scale inhibitors, such as triethanolamine phosphate and salts thereof, phosphonic acid based scale inhibitors, such as aminomethylenephosphonic acid, 1-hydroxyethyl-1,1-diphosphonic acid and salts thereof, 2-hydroxyethylamino bismethylenephosphonic acid and salts thereof, phosphonocarboxylic acids, and polymeric polyanionic scale inhibitors. Suitable polymeric polyanionic scale inhibitors include homopolymers and copolymers comprising monomeric units derived from water soluble or partially water soluble ethylenically unsaturated monomers having an anionic substituent group, such as for example, acrylic acid, vinyl sulfonic acid, methacrylic acid, maleic acid, itaconic acid, fumaric acid, vinyl acetate, allyl alcohol, allyl sulfonic acid, vinyl phosphonic acid, vinylidene diphosphonic acid.

In one embodiment, the scale inhibitor comprises one or more compounds selected from diethylene triaminepentakis (methylenephosphonic acid)s or salts thereof, such as sodium diethylenetriaminepentakis(methylene phosphonate, 2, phosphonobutane-1,2,4-tricarboxylic acid, homopolymers of acylic acid, maleic acid, or vinyl sulfonic acid, co-polymers of vinylphosphonic acid and vinylsulfonic acid, co-polymers of maleic acid and allylsulfonic acid, co-polymers of vinyl phosphonic acid and vinyl sulfonic acid, phosphonic acid terminated oligomers, such as

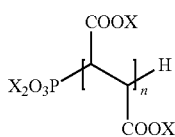

and phosphonic acid terminated polymers, such as for example,

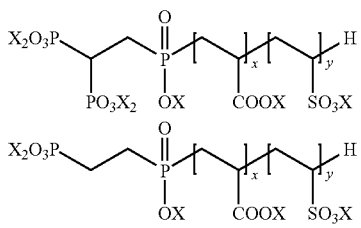

wherein X is H or an anion and x and y are chosen to obtain a ratio and MW which gives optimum performance, typically x+y is greater than or equal to 2 and less than or equal to 500.

The scale treatment composition of the present invention comprises an amount of scale inhibitor effective to inhibit scale formation under the conditions of use. More typically, the scale squeeze treatment composition of the present invention comprises, from about 0.01 to about 50 percent by weight ("wt %"), more typically from about 1 to about 20 wt % of the scale inhibitor.

Viscoelastic surfactants are monomeric species which have the ability to form worm-like micelles at low concentrations (0.1%), which can modify the viscosity of a fluid and generate a gel. Although not wishing to be bound by any theory, viscoelasticity is believed to be result from a different type of micelle formation than the usual spherical micelles formed by most surfactants. Viscoelastic surfactants form worm-like, rod-like or cylindrical micelles in solution. Viscoelastic surfactants are preferred because they remain stable in high shear applications, i.e., they do not irreversibly degrade under high shear. Fluids having viscoelastic surfactants also exhibit higher conductivity through a reservoir or formation than fluids having non-viscoelastic surfactants.

The property of viscoelasticity in general is well known and reference is made to S. Gravsholt, Journal of Coll. And Interface Sci., 57(3), 575 (1976); Hoffmann et al., "Influence of Ionic Surfactants on the Viscoelastic Properties of Zwitterionic Surfactant Solutions", Langmuir, 8, 2140-2146 91992); and Hoffmann et al., The Rheological Behaviour of Different Viscoelastic Surfactant Solutions, Tenside Surf. Det., 31, 289-400, 1994. Of the test methods specified by these references to determine whether a liquid possesses viscoelastic properties, one test that has been found to be useful in determining the viscoelasticity of an aqueous solution consists of swirling the solution and visually observing whether the bubbles created by the swirling recoil after the swirling is stopped. Any recoil of the bubbles indicates viscoelasticity. Another useful test is to measure the storage modulus (G') and the loss modulus (G") at a given temperature. If G'>G" at some point or over some range of points below about 10 rad/sec, typically between about 0.001 to about 10 rad/sec, more typically between about 0.1 and about 10 rad/sec, at a given temperature and if G'>$10^{-2}$ Pascals, preferably $10^{-1}$ Pascals, the fluid is typically considered viscoelastic at that temperature. Rheological measurements such as G' and G" are discussed more fully in "Rheological Measurements", Encyclopedia of Chemical Technology, vol. 21, pp. 347-372, (John Wiley & Sons, Inc., N.Y., N.Y., 1997, 4th ed.). The above disclosures are expressly incorporated herein by reference.

Viscoelastic cationic surfactants useful in the present invention include those selected from i) certain quaternary salts and ii) certain amines, iii) certain amine oxides, iv) and combinations thereof. Representative cationic surfactants are described below.

Suitable quaternary salts include those according to formula (I):

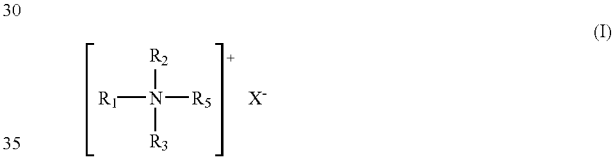

wherein:
$R_1$ is a hydrophobic moiety of alkyl, alkylarylalkyl, alkoxyalkyl, alkylaminoalkyl or alkylamidoalkyl, and wherein $R_1$ has from about 16 to about 22 carbon atoms and may be branched or straight-chained and saturated or unsaturated, $R_2$ and $R_3$ are each independently i) an aliphatic group, or ii) an aliphatic group with an aromatic or benzylic moiety bonded therewith, and X is suitable counter-anion, such as Cl$^-$, Br$^-$, and CH$_3$CH$_3$SO$_4^-$. Typically, $R_2$, $R_3$, and $R_5$ have from 1 to about 20 atoms. The aliphatic group can be branched or straight-chained and saturated or unsaturated. $R_2$, $R_3$, and $R_5$ can be, for example, alkyl, oxyalkyl, polyoxyalkyl, alkoxy, and alkylaryl. Preferably, $R_2$, $R_3$, and $R_5$ are alkyl groups. Most preferably, $R_2$, $R_3$, and $R_5$ are methyl or ethyl groups Suitable amines include those according to I formula (II):

wherein $R_1$, $R_2$, and $R_3$ are each as defined above.
Representative amines of the above structure include polyoxyethylenated (2-15) cocoalkylamines, polyoxyethylenated (12-18) tallow alkylamines, and polyoxyethylenated (2-15) oleyl and erucyl amines Examples of nonpolymeric, viscoelastic anionic surfactants useful in the present invention are represented by the formulas (III) to (VII):

$$ROSO_3^- \tag{III}$$

$$R(OCHR'CHR')_mOSO_3^- \tag{IV}$$

$$RSO_3^- \tag{V}$$

$$R(OCHR'CHR')_mSO_3^- \tag{VI}$$

$$RC_6H_4-SO_3^- \tag{VII}$$

wherein each R independently represents an alkyl, alkenyl, arylalkyl, or hydroxyalkyl group. In each case, R has about 16 to about 24 carbon atoms and more preferably about 16 to about 20 carbon atoms and R may be saturated or unsaturated, branched or straight chained, wherein branch alkyl groups have from 1 to about 6 carbon atoms. Representative alkyl groups for R include decyl, dodecyl, tetradecyl (myristyl), hexadecyl (cetyl), octadecyl (oleyl), stearyl, erucyl, and the derivatives of coco, tallow, soy, and rapeseed oils. The number of alkylene oxide groups, m, ranges from 0 to about 35 and more preferably 0 to about 10.

Examples of nonpolymeric, viscoelastic zwitterionic surfactants useful in the present invention include compounds according to formula (VIII):

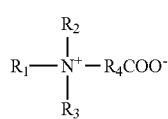
(VIII)

wherein:

$R_1$ represents a hydrophobic moiety of alkyl, alkylarylalkyl, alkoxyalkyl, alkylaminoalkyl and alkylamidoalkyl, wherein alkyl represents a group that contains from about 16 to about 24 carbon atoms which may be branched or straight chained and which may be saturated or unsaturated, $R_2$ and $R_3$ are independently an aliphatic chain (i.e. as opposed to aromatic at the atom bonded to the quaternary nitrogen, e.g., alkyl, alkenyl, arylalkyl, hydroxyalkyl, carboxyalkyl, and hydroxyalkyl-polyoxyalkylene, e.g. hydroxyethyl-polyoxyethylene or hydroxypropyl-polyoxypropylene) having from 1 to about 30 carbon atoms, preferably from about 1 to about 20 carbon atoms, more preferably from about 1 to about 10 carbon atoms and most preferably from about 1 to about 6 carbon atoms in which the aliphatic group can be branched or straight chained, saturated or unsaturated, and $R_4$ is a hydrocarbyl radical (e.g. alkylene) with chain length 1 to 4. Representative $R_1$ long-chain alkyl groups include tetradecyl (myristyl), hexadecyl (cetyl), octadecenyl (oleyl), octadecyl (stearyl), docosenoic (erucyl) and the derivatives of tallow, coco, soya and rapeseed oils. The preferred alkyl and alkenyl groups are alkyl and alkenyl groups having from about 16 to about 22 carbon atoms. Representative of alkylamidoalkyl is alkylamidopropyl with alkyl being as described above. Preferred $R_2$ and $R_3$ alkyl chains are methyl, ethyl, preferred arylalkyl is benzyl, and preferred hydroxyalkyls are hydroxyethyl or hydroxypropyl, while preferred carboxyalkyls are acetate and propionate. Preferred hydroxyalkyl-polyoxyalkylenes are hydroxyethyl-polyoxyethylene and hydroxypropyl-polyoxyethylene. Preferred $R_4$ radicals are methylene or ethylene groups Specific examples of viscoelastic zwitterionic surfactants include compounds according to structure IX-XII:

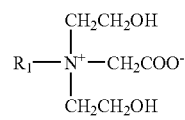
(IX)

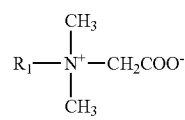
(X)

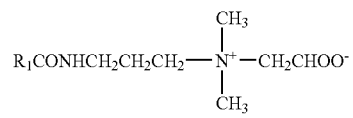
(XI)

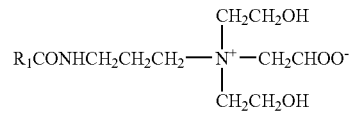
(XII)

wherein each $R_1$ is independently as defined above

Another example of a viscoelastic zwitterionic surfactant selected is an amine oxide according to structure XIII:

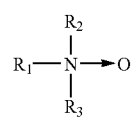
XIII wherein $R_1$, $R_2$, and $R_3$ are as defined above.

Other representative zwitterionic surfactants include dihydroxyethyl tallow glaciate, propionates, oleamidopropyl betaine, and erucyl amidopropyl betaine.

Examples of nonpolymeric, viscoelastic amphoteric surfactants include those represented by structure XIV:

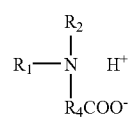
XIV wherein $R_1$, $R_2$, and $R_4$ are as defined above.

Other specific examples of viscoelastic amphoteric surfactants include compounds according to structures XV and XVI:

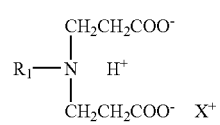
XV

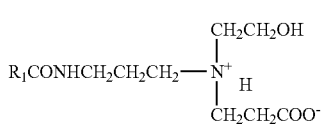

wherein $R_1$, has been previously defined herein, and $X^+$ is an inorganic cation such as $Na^+$, $K^+$, $NH_4^+$ associated with a carboxylate group or hydrogen atom in an acidic medium.

Useful viscoelastic zwitterionic and amphoteric surfactants include those disclosed in U.S. Pat. No. 6,831,108 B2, which is incorporated herein by reference.

The treatment composition optionally further comprises one or more members from the group of organic acids, organic acid salts, and inorganic acids, and inorganic salts. The organic acid or salt thereof aids in the development of increased viscosity. Since brackish water is frequently used as a flooding fluid in the oilfield, salt content at some level may already present.

The viscoelastic surfactant component can be present in amounts of 0.1 to 50 wt. % of the composition which includes scale inhibitor but will preferably be present in only a minor amount (e.g. less than about 20% by weight of the composition). In some embodiments about 10% viscoelastic surfactant is present in the solution. The organic acid or organic acid salt will preferably be present in the viscoelastic surfactant fluid at a weight concentration of about 0.1% to about 10%, more preferably from about 0.1% to about 7%, and even more preferably from about 0.1% to about 6%. The inorganic salt will preferably be present in the viscoelastic fluid at a weight concentration of about 0.1% to about 30%, more preferably about 0.1% to about 10%, and even more preferably from about 0.1% to about 8%. Organic salts, e.g. trimethylammonium hydrochloride and tetramethylammonium chloride, may also be used in addition to, or as a replacement for, the inorganic salts.

Useful organic acids are typically those of a sulfonic acid or a carboxylic acid. Anionic counter-ions of the organic acid salts are typically sulfonates or carboxylates. Representative of such organic molecules include aromatic sulfonates and carboxylates such as p-toluene sulfonate, naphthalene sulfonate, chlorobenzoic acid, salicylic acid, phthalic acid and the like, wherein such counter-ions are water-soluble. Most preferred are salicylate, phthalate, p-toluene sulfonate, hydroxynaphthalene carboxylates, e.g. 5-hydroxy-1-napthoic acid, 6-hydroxy-1-napthoic acid, 7-hydroxy-1-napthoic acid, 1-hydroxy-2-naphthoic acid, preferably 3-hydroxy-2-naphthoic acid, 5-hydroxy-2-naphthoic acid, 7-hydroxy-2-napthoic acid, and 1,3-dihydroxy-2-naphthoic acid and 3,4-dichlorobenzoate. The organic acid or salt thereof will optionally be present in the flooding fluid at from about 0.1 wt % to about 10 wt %, more typically from about 0.1 wt % to about 7 wt %, and even more typically from about 0.1 wt % to about 6 wt % based on the total weight of the flooding fluid.

Useful inorganic salts include water-soluble potassium, sodium, and ammonium salts, such as potassium chloride and ammonium chloride. Additionally, calcium chloride, calcium bromide and zinc halide salts may also be used. The inorganic salt is optionally present in the flooding fluid at a weight concentration of from about 0.1 wt % to about 30 wt %, more typically from about 0.1 wt % to about 10 wt %, and even more typically from about 0.1 wt % to about 8 wt %. Organic salts, e.g. trimethylammonium hydrochloride and tetramethylammonium chloride, may also be used in addition to, or as a replacement for, the inorganic salts.

Viscoelastic surfactants can be used with scale inhibitor squeeze solution to increase the viscosity and then improve the placement of such solutions in horizontal wells. The advantages of using viscoelastic surfactant are improved shear-thinning profile, high permeability, robust salt tolerance, and that the gel formed downhole will break as soon as it comes into contact with the oil. As a result, such fluid will not need the use of any breaker. In addition, viscoelastic surfactants currently used in fracturing fluids are known to avoid formation damage by maintaining high conductivity. Finally, being monomeric species, will not undergo decomposition at high shear rate or high temperature, which can be the case of polymers.

Such materials have many uses in addition to scale inhibition; they may be used (usually in conjunction with acids, for example selected from the group consisting of hydrochloric, sulfuric, phosphoric, hydrofluoric, formic, acetic, boric, citric, malic, tartaric, and maleic acids and mixtures thereof; and/or chelating agents, for example aminopolycarboxylic acid chelating agents selected from the group consisting of ethylenediamine tetraacetic acid (EDTA), hydroxyethylethylenediamine triacetic acid (HEDTA), diethylenetriamine pentaacetic acid (DTPA), hydroxyethyliminodiacetic acid (HEIDA), nitrilotriacetic acid (NTA), and their K, Na, NH4 or amine salts, and mixtures thereof,) in matrix stimulation (e.g. matrix dissolution, matrix acidizing, acid fracturing), in industrial and household cleaners, in scale dissolution in wellbores, in filtercake cleanup, in mudcake removal, and in other uses in the oilfield and elsewhere. As one example, the compositions of the invention may be used in simultaneous (or sequential) treatment that includes both scale control and matrix acidizing. As another example, for dissolution of solids such as scales or formations, the method involves contacting the solid material with the composition of the invention containing one or more than one of an acid, a chelating agent, and mixtures of these dissolvers, with the viscoelastic surfactant and a suitable scale inhibitor. It is to be understood that scale in the oilfield may be in a formation, in a wellbore, in surface equipment, in or on downhole tools, in fractures, in gravel packs, and in other locations. Discussions and teachings of "scale inhibitors" and "scale inhibition" are to be understood here to include discussions and teachings of "scale dissolution" and "matrix stimulation" as well. In all these uses, the fluid may further contain additional additives such as corrosion inhibitors and iron control agents, and may be foamed or energized with a gas or liquefied gas. When used with an acid or acids, the acid concentration is below that which causes the fluid to act as a self-diverting acid.

Examples

The following examples in which all parts and percentages are by weight unless otherwise indicated illustrate a few embodiments of the invention.

A series of exemplary composition were made by combining water, a scale inhibitor (10% solutions of phosphonate end-capped polymer (Aquarite ESL brand) and phosphonate scale inhibitor, diethylenetriamine tetrakis(methylenephosphonic acid (Briquest 543-45AS brand)) with a rheology modifier (either aqueous solutions of amphoteric surfactant (30% oleic amidopropyl betaine, identified as OAPB, and 38% active erucic amidopropyl betaine, identified as EAPB) or, as a comparative example, a succinoglycan (Rheozan)). Each of the exemplary compositions was made as follows. First, a 200 ml scale inhibitor solution was added to a 1 L glass container jar placed on a two speed Warring Laboratory Blender. A certain amount rheology modifier was then added to the jar. The blender speed was gradually adjusted to about 5000 rpm over ~20 seconds. Mixing was allowed to occur at this rate for the first 2 minutes. Then the blender speed was set to about 10,000 rpm for an additional 1 minute. The fluid was then poured and stored into a plastic container until the sample is completely de-aired.

200 ml de-aired samples of the exemplary compositions were poured into a 250 ml beaker for analysis on the Ofite Model 900 viscometer. The Ofite viscometer measures the couette flow between coaxial cylinders. Measurements were conducted at ambient temperature with varying shear rates/rpm.

viscometer, to which the cup is connected. Nitrogen gas is used to pressurize the cup which keeps the aqueous fluid in place at high temperatures. The test is then run at 100 s-1 from room temperature to 300 F. The cup is rotated and the torque is measured by the bob. The data provides the viscosity of the fluid at a shear rate of 100 s-1 over a temperature ramp.

Table I contains viscosity results, in centiPoise (cP), from of measurements for Rheozan, (comparative), versus EAPB, and OAPB (two examples representing the invention) gels in 10% Aquarite ESL and 10% Briquest 543-45AS., as measured at different shear rates (given as Ofite Model 900 viscometer rpm). Rheozan and EAPB produce homogeneous shear thinning gels in Aquarite ESL, a brand of phosphonate end capped vinyl sulfonic acid/acrylic acid copolymer. Furthermore, 0.2% EAPB performs similarly to 0.1% Rheozan at ambient temperatures. OAPB produces a homogeneous shear-thinning gel in Briquest 543-45AS These data demonstrate that a solution of DETA (diethylenetriamine tetrakis(methylenephosphonic acid) or a solution of phosphonate end-capped polymer can be viscosified by the addition of small amounts of viscoelastic surfactant.

TABLE I

| Aquarite ESL | Rheology Modifier (wt %) | | Viscosity (cP) | | | | | |
|---|---|---|---|---|---|---|---|---|
| | succinoglycan (Rheozan) | EAPB | 5 rpm | 10 rpm | 20 rpm | 50 rpm | 59 rpm | 100 rpm |
| 10% | 0.1* | 0 | 55.3 | 28.8 | 15.3 | 14.5 | 14 | 9.5 |
| | 0 | 0.1 | 24.7 | 12.4 | 6.3 | 2.9 | 2.7 | 1.7 |
| | 0 | 0.2 | 30.8 | 28.2 | 23.5 | 18.5 | 18.3 | 14.5 |
| | 0 | 0.5 | 180.9 | 134.9 | 82.4 | 47.4 | 38.5 | 26.1 |
| | 0 | 1.0 | 813 | 472 | 262 | 136 | 110 | 76 |

| Briquest 543-45AS | Rheology Modifier (wt. %) | | Viscosity (cP) | | | | | |
|---|---|---|---|---|---|---|---|---|
| | OAPB | EAPB | 5 rpm | 10 rpm | 20 rpm | 50 rpm | 59 rpm | 100 rpm |
| 10% | 0 | 0.1 | 21.5 | 14.2 | 8.4 | 5.7 | 4.9 | 3.1 |
| | 0 | 1 | 28.8 | 13.9 | 7 | 3.1 | 2.7 | 2.7 |
| | 0.3 | 0 | 24.5 | 14.5 | 13.8 | 13.4 | 11.7 | 11.3 |

Fann 50 viscometer experiments were also conducted to measure the fluids viscosity of the exemplary compositions at a constant shear-rate of 100s-1 with a temperature ramp. The Fann 50 mimics the downhole temperature and shear-rate conditions. Forty five grams of gel is placed in the appropriate cup. The proper collar and bob is then attached to the Fann 50

Table 2 shows the viscosity, in centiPoise (cp) measured at different shear rates, given as (given as Ofite Model 900 viscometer rpm) and illustrates shear-thinning behavior of the EAPB and OAPB gels. The worm-like micelles produced by the betaine surfactants cause the viscosity to decrease with increasing shear-rate.

TABLE 2

| Aquarite ESL (wt %) | Rheology Modifier (wt. %) | | Viscosity (cP) | | | | | |
|---|---|---|---|---|---|---|---|---|
| | succinoglycan (Rheozan) | EAPB | 5 rpm | 10 rpm | 20 rpm | 50 rpm | 59 rpm | 100 rpm |
| 10 | 0.1 | 0 | 55.3 | 28.8 | 15.3 | 14.5 | 14 | 9.5 |
| | 0 | 0.1 | 24.7 | 12.4 | 6.3 | 2.9 | 2.7 | 1.7 |
| | 0 | 0.2 | 30.8 | 28.2 | 23.5 | 18.5 | 18.3 | 14.5 |
| | 0 | 0.5 | 180.9 | 134.9 | 82.4 | 47.4 | 38.5 | 26.1 |
| | 0 | 1.0 | 813 | 472 | 262 | 136 | 110 | 76 |

TABLE 2-continued

| Briquest 543-25S (wt %) | Rheology Modifier (wt %) | | Viscosity (cP) | | | | | |
|---|---|---|---|---|---|---|---|---|
| | OAPB | EAPB | 5 rpm | 10 rpm | 20 rpm | 50 rpm | 59 rpm | 100 rpm |
| 10 | 0 | 0.1 | 21.5 | 14.2 | 8.4 | 5.7 | 4.9 | 3.1 |
| | 0 | 1 | 28.8 | 13.9 | 7 | 3.1 | 2.7 | 2.7 |
| | 0.3 | 0 | 24.5 | 14.5 | 13.8 | 13.4 | 11.7 | 11.3 |

Table 3 shows viscosity, in centiPoise (cP), vs. temperature, in degrees Fahrenheit (° F.), results for 6% as is EAPB gels in 10% and 25% Aquarite ESL, as measured using a Fann 50 viscometer at a shear rate of 100 s$^{-1}$. The typical viscosity behavior for EAPB gels is observed by the two viscosity peaks. Temperatures up to 250° F. can be obtained keeping 50 cP as the minimum for a 6% gel.

TABLE 3

| | Viscosity (cP) at 100 s$^{-1}$ | |
|---|---|---|
| Temperature (° F.) | 6 ml EAPB in 100 ml 25% Aquarite ESL | 6 ml EAPB in 100 ml 10% Aquarite ESL |
| 80 | 240 | 139 |
| 90 | 287 | 160 |
| 100 | 302 | 200 |
| 110 | 241 | 183 |
| 120 | 171 | 127 |
| 130 | 105 | 97 |
| 140 | 94 | 65 |
| 150 | 93 | 64 |
| 160 | 96 | 69 |
| 170 | 100 | 74 |
| 180 | 105 | 82 |
| 190 | 110 | 91 |
| 200 | 116 | 93 |
| 210 | 115 | 103 |
| 220 | 106 | 116 |
| 230 | 86 | 113 |
| 240 | 56 | 85 |
| 250 | 48 | 56 |
| 260 | 43 | 37 |
| 270 | 39 | 35 |
| 280 | 41 | 45 |
| 290 | 52 | 45 |
| 300 | 16 | 45 |

Table 4 shows viscosity, in centipoise (cP), vs. temperature, in degrees Fahrenheit (° F.), result for 5 and 10% OAPB gels produced in 10% Briquest 543-45AS gels, as measured using a Fann 50 viscometer at a shear rate of 100 s$^{-1}$. These gels show extremely high viscosities at low temperatures and can maintain a viscosity of 50 cP up to about 200° F.

TABLE 4

| | Viscosity (cP) at 100 s$^{-1}$ | |
|---|---|---|
| Temperature (° F.) | 5% OAPB in 100 ml Briquest 543S (10%) | 10% OAPB in 100 ml Briquest 543S (10%) |
| 80 | 94 | 257 |
| 90 | 105 | 328 |
| 100 | 111 | 375 |
| 110 | 115 | 409 |
| 120 | 119 | 416 |
| 130 | 117 | 409 |
| 140 | 113 | 395 |
| 150 | 113 | 357 |
| 160 | 96 | 296 |
| 170 | 79 | 251 |
| 180 | 64 | 197 |
| 190 | 49 | 146 |
| 200 | 37 | 88 |
| 210 | 26 | 51 |
| 220 | 21 | 35 |
| 230 | 20 | 27 |
| 240 | 20 | 24 |
| 250 | 20 | 23 |
| 260 | 20 | 23 |
| 270 | 20 | 23 |
| 280 | 20 | 23 |
| 290 | 20 | 23 |
| 300 | 20 | 23 |

The combination of EAPB and OAPB can produce a gel specifically for a given temperature range.

While the invention has been described and illustrated in sufficient detail for those skilled in this art to make and use it, various alternatives are within the spirit and scope of the invention and should become apparent.

What is claimed is:

1. An aqueous composition for treating hydrocarbon wells, comprising:
   (a) from about 0.1 to 20 parts by weight, based on 100 parts by weight of the composition, of a scale inhibitor selected from phosphate ester scale inhibitors, phosphonic acid based scale inhibitors, phosphonocarboxylic acids, polymeric polyanionic scale inhibitors, and mixtures thereof; and
   (b) a viscoelastic surfactant comprising a hydrophobic moiety of alkyl, alkylarylalkyl, alkoxyalkyl, alkylaminoalkyl or alkylamidoalkyl, wherein the alkyl represents a group containing from about 16 to about 24 carbon atoms,
said composition further comprising from 0 to less than 1% by weight of acid selected from the group consisting of hydrochloric acid, sulfuric acid, phosphoric acid, formic acid, acetic acid, citric acid, maleic acid, hydrofluoric acid, and mixtures thereof.

2. The composition of claim 1, wherein the scale inhibitor is a sulphonate-functional phosphonated end-capped copolymer or diethylene triaminepentakis (methylenephosphonic acid).

3. The composition of claim 1 wherein the viscoelastic surfactant comprises an amphoteric surfactant selected from oleic amidopropyl betaine, erucic amidopropyl betaine, and mixtures thereof.

4. The composition of claim 1 wherein the solution comprises, based on 100 parts by weight of the composition, from about 0.1 to 20 parts by weight scale inhibitor and about 0.1 to 50 parts by weight viscoelastic surfactant.

5. A scale squeeze kit for use in hydrocarbon wells consisting of two parts, (A) and (B), wherein part (A) consists of a viscoelastic surfactant comprising a hydrophobic moiety of alkyl, alkylarylalkyl, alkoxyalkyl, alkylaminoalkyl or alkylamidoalkyl, wherein the alkyl represents a group containing from about 16 to about 24 carbon atoms, and part (B) consists of a scale inhibitor selected from phosphate ester scale inhibitors, phosphonic acid based scale inhibitors, phosphonocarboxylic acids, polymeric polyanionic scale inhibitors, and mixtures thereof, neither part comprising a self-diverting acid, the two parts being compatible and adapted to be mixed, causing the scale inhibitor to be fully viscosified prior to placement in a well.

6. The kit of claim 5 wherein the viscoelastic surfactant is a solution of an amphoteric surfactant selected from the group consisting of oleic amidopropyl betaine (OAPB) and erucic amidopropyl betaine (EAPB).

7. The kit of claim 5 comprising about 0.1 to 50% by weight (A) and about 1 to 50% by weight (B).

8. The kit of claim 5 wherein the scale inhibitor is a sulphonate-functional phosphonated copolymer or a soluble source of diethylene-triaminepentakis (methylenephosphonic acid).

* * * * *